United States Patent [19]
Hortman

[11] 3,813,854
[45] June 4, 1974

[54] CENTRIFUGAL SEPARATOR HAVING AXIAL-FLOW VORTEX GENERATOR

[76] Inventor: Norman A. Hortman, Brick Yard Rd., Titusville, N.J. 08560

[22] Filed: July 7, 1972

[21] Appl. No.: 269,607

[52] U.S. Cl.................... 55/399, 55/439, 55/447, 55/457
[51] Int. Cl............................................. B01d 45/04
[58] Field of Search ............ 55/320, 321, 337, 443, 55/456, 457, 418, 452, 467, DIG. 30, DIG. 46, 307, 331, 434, 440, 476, 439, 399; 60/311

[56] References Cited
UNITED STATES PATENTS

| | | | |
|---|---|---|---|
| 530,023 | 11/1894 | De Ryeke | 55/DIG. 23 |
| 2,413,324 | 12/1946 | Holzwarth | 55/452 |
| 3,224,171 | 12/1965 | Bowman | 55/DIG. 30 |
| 1,146,262 | 3/1969 | General Electric Co. | 55/452 |
| 3,633,343 | 1/1972 | Mark | 55/337 |
| 3,641,745 | 2/1972 | Moore | 55/457 |

Primary Examiner—Frank W. Lutter
Assistant Examiner—David Lacey
Attorney, Agent, or Firm—Howson & Howson; Stanley B. Kita

[57] ABSTRACT

In a centrifugal separator having a hollow cylindrical casing with coaxial inlet and outlet zones through which a particle-laden medium is flowed, airfoil means is provided in the inlet zone for creating a vortex in the casing to separate the particles from the medium. The airfoil extends radially into the inlet zone and has a leading edge facing upstream and a tip located centrally in the flow stream. As the medium flows at a high velocity across the airfoil a vortex is generated downstream of the tip and in the casing. A layer of porous material lines the inside of the casing to capture the particles which are separated from the medium by the centrifugal action of the vortex. A continuous helical vane extends between the inlet and the outlet to channel the swirling fluid in a helix as it flows through the casing. In one embodiment, a venturi-shaped insert is provided in the casing and an axial-flow fan is provided in the outlet zone for inducing a draft in the inlet zone to maintain the velocity of the medium in the inlet zone at a sufficiently high level to ensure generation of a vortex.

4 Claims, 7 Drawing Figures

PATENTED JUN 4 1974 3,813,854
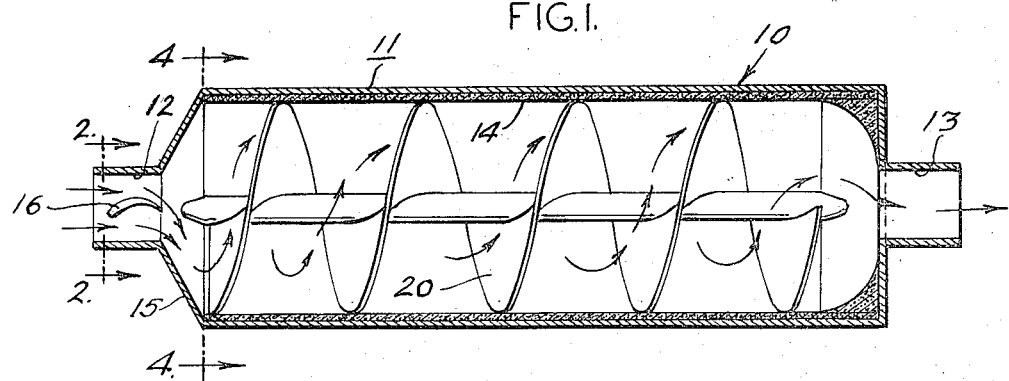
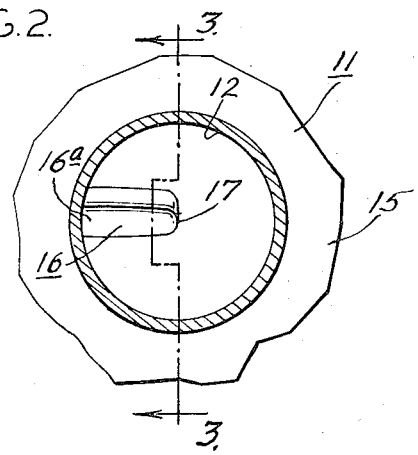
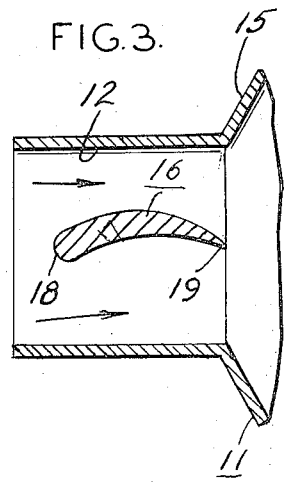
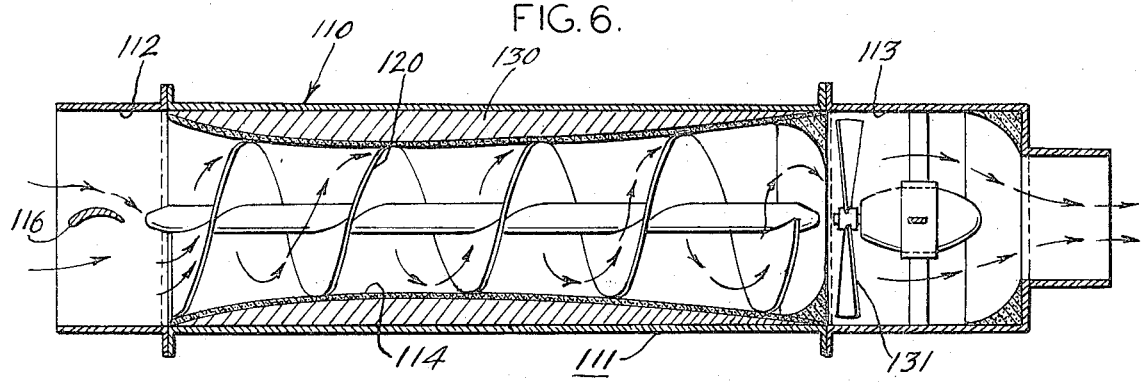
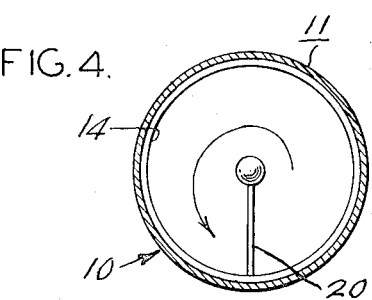
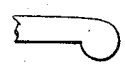

CENTRIFUGAL SEPARATOR HAVING AXIAL-FLOW VORTEX GENERATOR

The present invention relates to separating apparatus, and more particularly, the present invention relates to apparatus for separating entrained particulate matter from flowing mediums by means of a centrifugal action.

There are presently available separators which operate to separate particles from a flowing medium by causing the medium to flow in a circular path inside a collecting chamber. The particles are thrown by centrifugal force against the inside of the chamber, and when the chamber is disposed vertically, the particles settle downwardly along the walls of the chamber to the bottom from which they may be periodically removed. Most separators of this type create the required circular flow pattern by introducing the air tangentially at the top of the chamber.

It is known that particulate matter such as carbon particles are entrained in the exhaust gases which are discharged from internal combustion engines. At present, a considerable amount of effort is being directed toward providing apparatus which is capable of removing both particulate matter and noxious gases from engine exhausts. Because of spatial limitations and back-pressure considerations, tangential-flow separators would not be desirable. Moreover, such separators are relatively complicated and hence are expensive to fabricate.

In addition to the problem of removing particulate matter from the exhausts of internal combustion engines there exists the desirability of removing such matter from the gases which are discharged from industrial smoke stacks. At present, scrubbers and like washing apparatus are employed; however, such apparatus is complex and expensive to manufacture and maintain and is therefore undesirable.

With the foregoing in mind, it is a primary object of the present invention to provide a novel centrifugal-type separator for particulate matter wherein airfoil means generates the required vortex action.

It is another object of the present invention to provide airfoil means in the inlet zone of a centrifugal separator having coaxial inlet and outlet zones for generating a vortex inside the separator as a medium flows at a high velocity across the airfoil and through the separator.

As a further object, the present invention provides an improved separator for use in pollution abatement apparatus to remove particulate matter entrained in moving gas streams such as produced by the combustion of hydrocarbon fuels.

It is a still further object of the present invention to provide a relatively compact particulate matter separator which has efficient means for generating an internal vortex to separate particulate matter from a moving gas stream by means of a centrifugal action.

As still another object, the present invention provides a unique separator having fan means in its outlet zone for flowing a medium through the separator and across a vortex-generating airfoil mounted in the inlet zone.

More specifically, in the present invention a hollow cylindrical separator having coaxial inlet and outlet zones is provided with airfoil means in the inlet zone for generating a vortex inside the separator to separate by a centrifugal action particulate matter entrained in a moving medium flowing at a high velocity through the separator. The airfoil means extends radially into the inlet zone and terminates in a tip located substantially centrally of the flow stream of the medium with the leading edge of the airfoil facing upstream. As the medium flows across the airfoil a vortex is generated downstream of the tip and inside the separator. The vortex rotates in a direction away from the tip; i.e., facing downstream the vortex rotates in a counterclockwise direction when the airfoil extends rightward into the inlet zone. A continuous helical vane extends between the inlet and outlet zones and is pitched to continue the rotation of the medium in the separator. A layer of porous material lines the interior of the separator to collect separated particulate matter. In one embodiment of the invention, the velocity of the medium flowing across the airfoil is maintained by means of an axial flow fan located in the outlet zone, and a venturi-shaped insert is mounted inside the separator.

These and other objects, features and advantages of the present invention should become apparent from the following description when taken in conjunction with the accompanying drawing in which:

FIG. 1 is a longitudinal cross-sectional view of a separator embodying the present invention;

FIG. 2 is an enlarged sectional view taken along line 2—2 of FIG. 1;

FIG. 3 is a sectional view taken along irregular line 3—3 of FIG. 2;

FIG. 4 is a sectional view taken along line 4—4 of FIG. 1 to illustrate the rotational direction of the vortex inside the separator;

FIGS. 5a and 5b are fragmentary views of two types of airfoil tips which may be employed satisfactorily in the present invention;

FIG. 6 is a view similar to FIG. 1 but of a modified embodiment of the present invention.

Referring now to the drawing, there is illustrated in FIG. 1 a separator 10 which embodies the present invention. As seen therein, the separator 10 comprises a hollow cylindrical casing 11 having an inlet zone 12 and an outlet zone 13 which are coaxial with the casing 11. It is noted that in the embodiment illustrated in FIG. 1 the inlet and outlet zones 12 and 13 are cylindrical and are of a diameter smaller than the diameter of the casing 11. The casing has a tapered section 15 which provides a transition zone downstream of the inlet 12.

The inside of the casing 11 is lined with a layer of porous material 14 having heat-resistant properties such as asbestos or the like. The layer 14 functions to capture particles which are separated from a fluid or gas medium as the medium flows through the separator from left to right as indicated by the flow arrows in FIG. 1. Preferably, the layer 14 is cylindrical and is readily removable and disposable.

In order to create the centrifugal forces required to separate the particulate matter from the medium flowing inside the separator 10, there is provided airfoil means 16 in the inlet zone 12 to initiate a vortex or swirling flow of the medium inside the casing 11. Heretofore, such motion was imparted by introducing the medium tangentially to the casing 11. In accordance with the present invention, however, a vortex is generated as the medium is flowed axially into the separator 10.

To this end, the airfoil means 16 is mounted in the inlet zone 12 (FIG. 1), and as best seen in FIGS. 2 and 3, the airfoil 16 has a root 16a mounted to the interior of inlet 12, and the airfoil 16 extends radially into the inlet 12 and terminates in a tip 17 located substantially centrally of the inlet 12. As best seen in FIG. 3, the airfoil 16 has a leading edge 18 which faces upstream and a trailing edge 19 which is located adjacent the transition zone 15 of the casing 11. Although the tip 17 of the airfoil 16 is rounded in FIG. 2, other tip configurations such as illustrated in FIGS. 5a and 5b may be employed satisfactorily, as long as the tip 17 is spaced from the interior of inlet 12 by a gap as illustrated in FIG. 2. Moreover, airfoils having different shapes may also be employed, although so-called "high-lift" airfoils would provide the greatest vortex-generating action.

In operation, a particle-laden medium is flowed through the separator 10 at a velocity sufficiently high to cause the airfoil to generate lift. For example, a velocity in excess of about 45 feet per second would tend to generate lift, with more lift being generated as the velocity increases above this value. As lift is generated by the airfoil 16, a vortex is created adjacent and downstream of the tip 17, the vortex rotating away from the tip 17 and toward the root 16a of the airfoil 16. In the illustrated embodiment, the airfoil 16 extends rightward into the inlet zone 12. Hence, the vortex rotates in the counterclockwise direction as indicated in FIG. 4. It should be apparent, however, that if the airfoil were to extend leftward into inlet zone 12, the vortex would rotate in the clockwise direction.

In order to continue the rotation of the medium in the separator 10, a continuous helical vane 20 is mounted inside the casing 11. In the present instance, the vane 20 is of a left-hand pitch; i.e., the vane 20 causes the medium to swirl in a counterclockwise direction. Preferably, the vane 20 is fabricated from a material which is sufficiently imperforate to guide the medium while being sufficiently porous to capture particles as the medium flows across the surfaces of the vane 20. Moreover, the vane 20 is preferably fabricated of a heat resistant and disposable material such as asbestos.

It should be apparent that the pitch direction of the vane must correspond with the direction of rotation of the vortex if turbulence inside the separator is to be kept to a minimum. Although the lift created by the airfoil tends to rotate the casing 11, the rotation may be restrained by suitable retainers (not shown). By virtue of this construction, the particles entrained in the medium are thrown radially outward by means of centrifugal forces created by the vortex in the casing 11, and the particles adhere to the porous material 14 which lines the casing 11. After a period of operation, the lining 14 and the vane 20 may be removed and replaced.

The separator 10 is particularly useful in removing particulate matter from the exhaust stream of an internal combustion engine since the separator 10 is relatively compact and would fit well within the spatial limitations required in automotive environments. If desired, a heat-resistant filtering material such as stainless steel wool or the like may be packed inside the casing to increase the ability of the separator to remove particulate matter from the exhaust stream.

In FIG. 6 there is illustrated a modified embodiment of the present invention which is particularly suited for use in removing particulate matter from combustion gases exiting an industrial smoke stack. As seen therein, a separator 110 has a cylindrical casing 111 with a venturi-shaped insert 130. A layer of porous heat-resistant material 114 lines the inside of the venturi 130. A helical vane 120 is mounted inside the venturi 130, and the vane 120 extends between the inlet zone 112 and the outlet zone 113 of the casing 111. An airfoil 116 is mounted in the inlet zone 112 in a manner similar to that of the first-mentioned embodiment for producing a vortex inside the casing 111.

In this embodiment, an axial-flow fan 131 is mounted in the outlet zone 112. The fan 131 operates to induce a draft in the axial direction in the inlet 112 to cause gas to flow across the airfoil 116 at a sufficiently high velocity to create a vortex action inside the casing. The vortex action in turn causes the particulate matter entrained in the gas to be thrown radially outward and captured by the porous lining 114 on the inside of the venturi 130. In this embodiment, the venturi-insert 130 operates to increase the velocity of the gases in the axial direction in the casing 111. With this structure, the separator 110 may be employed satisfactorily to remove particulate matter entrained in relatively slowly-moving gas streams, such as industrial smoke stacks.

In view of the foregoing, it should be apparent that novel separators have been provided for removing particulate matter entrained in moving mediums such as the exhaust from internal combustion engines and industrial power plants.

While preferred embodiments of the present invention have been described in detail, various modifications, alterations and changes may be made without departing from the spirit and scope of the present invention as defined in the appended claims.

I claim:

1. Apparatus for separating particles entrained in a flowing medium, comprising: a cylindrical casing having a hollow interior with an inlet at one end defining an inlet flow passage opening axially into said casing and an outlet at the other end defining an outlet flow passage opening into said casing; a lift-generating airfoil located in said inlet for reacting with a medium flowing across the airfoil to generate a vortex downstream of the airfoil in said casing, said airfoil having at one end a root mounted to said inlet and leading and trailing edges extending in cantilever fashion into said inlet passage from said root, said airfoil terminating at its other end in a tip extending axially of said inlet between said leading and trailing edges with said tip being located centrally of said inlet and spaced from the interior of the inlet by a gap; and means lining the interior of said casing for capturing particles entrained in the flowing medium; so that when the medium flows across the airfoil from the leading edge to the trailing edge, a vortex is generated downstream of the tip and the vortex rotates in a predetermined direction about an axis trailing from the tip to create centrifugal forces for displacing particles entrained in the medium radially outward for capture by the lining.

2. Apparatus according to claim 1 including means providing a continuous helical vane inside said casing, said vane extending from said inlet zone to said outlet zone and having a pitch direction corresponding to the direction of rotation of the vortex created by the airfoil means.

3. Apparatus according to claim 2 including means providing a venturi shape inside said casing between said inlet zone and said outlet zone, whereby the velocity of fluid flow increases in an axial direction in said casing.

4. Apparatus according to claim 3 including fan means located in said outlet zone for inducing a draft in said inlet zone.

* * * * *